United States Patent
Stone et al.

(10) Patent No.: US 10,560,367 B2
(45) Date of Patent: Feb. 11, 2020

(54) BIDIRECTIONAL CONSTRAINED PATH SEARCH

(71) Applicants: Andrew W. Stone, Ottawa (CA); Felix Katz, Ottawa (CA); Ehsan Rezaaifar, Ottawa (CA); Attaullah Zabihi-Seissan, Kanata (CA)

(72) Inventors: Andrew W. Stone, Ottawa (CA); Felix Katz, Ottawa (CA); Ehsan Rezaaifar, Ottawa (CA); Attaullah Zabihi-Seissan, Kanata (CA)

(73) Assignee: Nokia of America Corporation, Murray Hill, NJ (US)

( * ) Notice: Subject to any disclaimer, the term of this patent is extended or adjusted under 35 U.S.C. 154(b) by 568 days.

(21) Appl. No.: 14/997,921

(22) Filed: Jan. 18, 2016

(65) Prior Publication Data
US 2017/0207993 A1   Jul. 20, 2017

(51) Int. Cl.
*H04L 12/751* (2013.01)

(52) U.S. Cl.
CPC .................. *H04L 45/02* (2013.01)

(58) Field of Classification Search
CPC ......... H04L 41/12; H04L 45/02; H04L 45/00; H04L 45/04; H04L 84/18
See application file for complete search history.

(56) References Cited

U.S. PATENT DOCUMENTS

| | | | |
|---|---|---|---|
| 6,744,740 B2 * | 6/2004 | Chen ................. | H04L 45/02 370/255 |
| 7,155,120 B1 * | 12/2006 | Ofek .................. | H04J 14/0227 370/216 |
| 7,590,067 B2 * | 9/2009 | Zhang ................ | H04L 45/02 370/238 |

(Continued)

OTHER PUBLICATIONS

Fast bandwidth-constrained quality of service routing via bidirectional search, Aug. 2, 2008 vol. 1, No. 4, (XP006029721), B.Zhang et al. (Year: 2007).*

(Continued)

*Primary Examiner* — Gbemileke J Onamuti
*Assistant Examiner* — Sanjay K Dewan
(74) *Attorney, Agent, or Firm* — Tong, Rea, Bentley & Kim, LLC

(57) ABSTRACT

This disclosure generally discloses a bidirectional constrained path search mechanism. The bidirectional constrained path search mechanism may be configured to determine bidirectional paths between a pair of nodes, subject to one or more constraints, such that the bidirectional paths share a common set of resources. The bidirectional constrained path search mechanism may be configured to determine bidirectional paths between a pair of nodes, subject to one or more constraints, by determining a forward path that satisfies a set of forward path constraints associated with the forward path and determining a reverse path that satisfies a set of reverse path constraints associated with the reverse path. The bidirectional constrained path search mechanism (Continued)

may be configured to determine bidirectional paths between a pair of nodes in a single path search iteration, such as via a traversal of a weighted directed graph, thereby improving performance.

21 Claims, 5 Drawing Sheets

(56) References Cited

U.S. PATENT DOCUMENTS

| | | | | |
|---|---|---|---|---|
| 7,593,341 B1* | 9/2009 | Buriol | ................... | H04L 45/00 370/238 |
| 8,116,197 B2* | 2/2012 | Nakash | ................... | H04L 45/02 370/228 |
| 8,208,403 B2* | 6/2012 | Sarkar | ................. | H04L 41/5054 370/254 |
| RE43,704 E * | 10/2012 | Gupta | ................... | H04L 41/044 370/254 |
| 8,824,337 B1* | 9/2014 | Geisberger | ......... | G01C 21/3446 370/238 |
| 2005/0088978 A1* | 4/2005 | Zhang | ................... | H04L 45/02 370/254 |
| 2007/0291762 A1* | 12/2007 | Yokota | ................... | H04L 45/00 370/395.3 |
| 2009/0141656 A1* | 6/2009 | Fan | ................... | H04L 29/12009 370/254 |
| 2009/0214098 A1* | 8/2009 | Hornegger | ............. | A61B 6/032 382/131 |
| 2009/0238075 A1* | 9/2009 | Mosko | ................... | H04L 45/00 370/238 |
| 2009/0296719 A1* | 12/2009 | Maier | ..................... | H04L 45/12 370/400 |
| 2010/0304640 A1* | 12/2010 | Sofman | .................. | A63H 17/40 446/456 |
| 2011/0170416 A1* | 7/2011 | Schwager | ............... | H04L 45/00 370/238 |
| 2011/0225312 A1* | 9/2011 | Liu | ......................... | H04L 12/18 709/231 |
| 2011/0292832 A1* | 12/2011 | Bottari | ............... | H04L 41/0896 370/254 |
| 2012/0063362 A1* | 3/2012 | Hongal | .................. | H04L 45/00 370/255 |
| 2012/0113125 A1* | 5/2012 | Guerrab | .................. | G06T 13/80 345/473 |
| 2016/0306645 A1* | 10/2016 | Serebrin | ............. | G06F 9/45558 |

OTHER PUBLICATIONS

Zhang et al., "Fast bandwith-contrained quality of service routing via bidirectional search," IET Communication, Aug. 2, 2007, vol. 1, No. 4, pp. 784-788.

International Search Report and Written Opinion for corresponding PCT Application No. PCT/US2017/013669, dated Apr. 5, 2017, 13 pages.

* cited by examiner

BIDIRECTIONAL CONSTRAINED PATH SEARCH

TECHNICAL FIELD

The present disclosure relates generally to the field of path searching and, more particularly but not exclusively, to performing constrained path searches in communication networks.

BACKGROUND

In many communication networks, end-to-end communication between a source device and a destination device traverses an end-to-end path that has been established from the source device to the destination device. There are various mechanisms for determining and establishing an end-to-end path from a source device to a destination device, many of which may have various disadvantages associated therewith.

SUMMARY

The present disclosure generally discloses a bidirectional constrained path search capability.

In at least some embodiments, an apparatus includes a processor and a memory communicatively connected to the processor, where the processor is configured to evaluate a forward link from a first node to a second node to determine whether the forward link satisfies a set of constraints associated with a forward path to be determined from a first end node to a second end node, evaluate a reverse link from the second node to the first node to determine whether the reverse link satisfies a set of constraints associated with a reverse path to be determined from the second end node to the first end node, and select the forward link for inclusion in the forward path based on a determination that the forward link satisfies the set of constraints associated with the forward path and a determination that the reverse link satisfies the set of constraints associated with the reverse path.

In at least some embodiments, a method includes evaluating a forward link from a first node to a second node to determine whether the forward link satisfies a set of constraints associated with a forward path to be determined from a first end node to a second end node, evaluating a reverse link from the second node to the first node to determine whether the reverse link satisfies a set of constraints associated with a reverse path to be determined from the second end node to the first end node, and selecting the forward link for inclusion in the forward path based on a determination that the forward link satisfies the set of constraints associated with the forward path and a determination that the reverse link satisfies the set of constraints associated with the reverse path.

In at least some embodiments, a non-transitory computer-readable storage medium stores instructions which, when executed by a computer, cause the computer to perform a method that includes evaluating a forward link from a first node to a second node to determine whether the forward link satisfies a set of constraints associated with a forward path to be determined from a first end node to a second end node, evaluating a reverse link from the second node to the first node to determine whether the reverse link satisfies a set of constraints associated with a reverse path to be determined from the second end node to the first end node, and selecting the forward link for inclusion in the forward path based on a determination that the forward link satisfies the set of constraints associated with the forward path and a determination that the reverse link satisfies the set of constraints associated with the reverse path.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

This disclosure generally discloses a bidirectional constrained path search mechanism. The bidirectional constrained path search mechanism may be configured to determine bidirectional communication paths between a pair of nodes subject to one or more constraints, which may include at least one of one or more forward path constraints or one or more reverse path constraints. The bidirectional constrained path search mechanism may be configured to determine bidirectional communication paths between a pair of nodes, subject to one or more constraints, in a manner for ensuring that the bidirectional communication paths utilize a common set of resources (e.g., traverse the same set of nodes using common link resources). The bidirectional constrained path search mechanism may be configured to determine bidirectional communication paths between a pair of nodes, subject to constraints, by determining a forward communication path that satisfies a set of one or more forward path constraints associated with the forward communication path and determining a reverse communication path that satisfies a set of one or more reverse path constraints associated with the reverse communication path. The bidirectional constrained path search mechanism may be configured to determine bidirectional communication paths between a pair of nodes during a forward traversal of a graph (e.g., a weighted directed graph) representing nodes and links available for selection. The bidirectional constrained path search mechanism may be configured to determine bidirectional communication paths between a pair of nodes in a single path search iteration, thereby improving performance (e.g., reducing path computation time for determining the two paths, reducing the number of data accesses necessary for determining the two paths, or the like). These and various other embodiments and potential advantages of the bidirectional constrained path search mechanism may be further understood by way of reference to FIG. 1.

Figure 1:
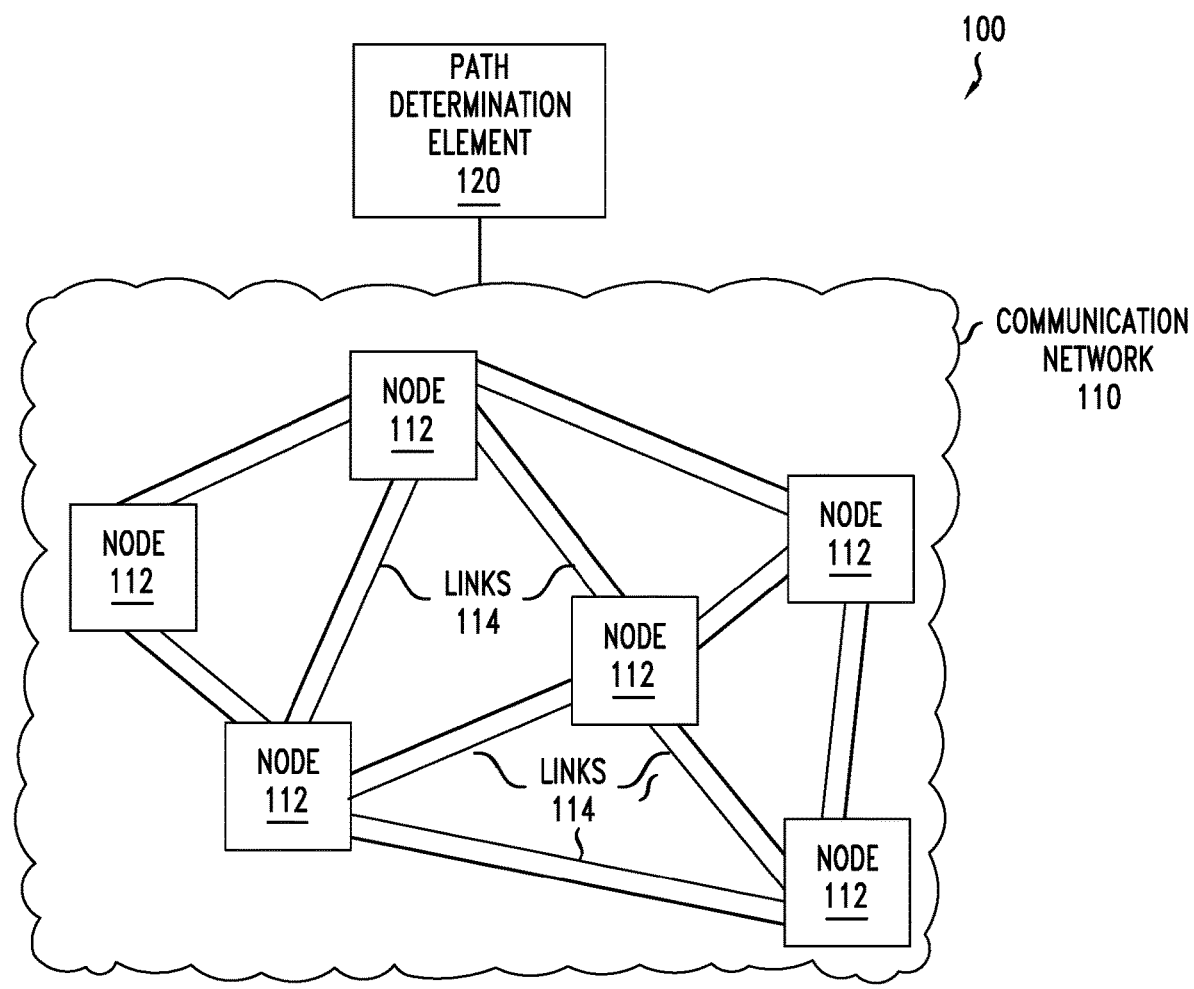
FIG. 1 depicts an exemplary a system including a communication network and a path determination element configured to perform bidirectional constrained path searches for the communication network.

FIG. 1 depicts an exemplary a system including a communication network and a path determination element configured to perform bidirectional constrained path searches for the communication network.

The system 100 includes a communication network 110 and a path determination element 120.

The communication network 110 may include any communication network which may support communications via communication paths. For example, communication network 110 may include an optical network, an Internet Protocol (IP) network, a Multiprotocol Label Switching (MPLS) network, a Software Defined Network (SDN), a wireless communication network, or the like, as well as various combinations thereof. For example, communication paths of communication network 110 may be optical paths in an optical network, IP paths in an IP network, Label Switched Paths (LSPs) in an MPLS network, wireless paths in a wireless network, or the like.

The communication network 110 includes a set of nodes 112 and a set of links 114. The nodes 112 are interconnected via the links 114 to provide a network topology for the communication network 110. The nodes 112 and links 114 may include various types of nodes 112 and links 114 which may support communications via communication paths, which may vary across different types of communication networks. For example, in the case in which the communication network 110 is an optical network, the nodes 112 may be optical nodes (e.g., optical switches, optical add/drop multiplexers, or the like) and the links 114 may be optical links (e.g., optical fibers or the like). For example, in the case in which the communication network 110 is an IP network or an MPLS network, the nodes 112 may be switches or routers and the links 114 may include any suitable types of links which may support communication between switches and routers. The links 114 may be physical links or logical links. The nodes 112 and links 114 may include any other types of nodes and links, respectively, suitable for supporting communications within communication network 110.

The communication network 110 is configured such that there are multiple links 114 between each pair of nodes 112. These multiple links 114 may be physical links and/or logical links. For example, where two nodes 112 are routers and the Open Shortest Path First (OSPF) protocol is active between the two routers, there may be two total links between the two routers (namely, a first OSPF link in one direction and a second OSPF link in the other direction). For example, where two nodes 112 are routers and both the OSPF and Intermediate System to Intermediate System (IS-IS) protocols are active between the two routers, there may be four total links between the two routers (namely, a first OSPF link and a first IS-IS link in one direction and a second OSPF link and a second IS-IS link in the other direction). It will be appreciated that fewer or more links 114 may be available between any given pair of nodes 112 of communication network 110. It will be appreciated that, while multiple links 114 may be present between a pair of nodes 112, any two of the multiple links 114 between the pair of nodes 112 may or may not be associated with each other as a link pair. In general, in order for two links 114 to be considered a link pair, the two links 114 may be directed in opposite directions while sharing termination points (i.e., the source node on one of the links 114 is the destination node on the other of the links 114, and vice versa). In some instances, however, this alone may not be sufficient for the two links 114 to be considered a link pair. In some instances, other link properties of the two links 114 may need to be evaluated in order to determine whether or not the two links 114 are to be considered a link pair (e.g., the IP subnets of the two links 114 must match in order for the two links 114 to be considered a link pair, the IP subnets and operational protocols of the two links must match in order for the two links 114 to be considered a link pair, or the like). For example, if two links 114 between a pair of nodes 112 (e.g., node A and node B) are both OSPF links but are assigned IP addresses belonging to different subnets (e.g., the link from node A to node B has IP 192.168.0.1/24 and the link from node B to node A has IP 192.168.1.2/24) then the two links, despite having the same protocol, may not be considered a link pair. For example, if two links 114 between a pair of nodes 112 (e.g., node A and node B) belong to the same subnet (e.g., the link from node A to node B has IP 192.168.0.1/24 and the link from node B to node A also has IP 192.168.0.1/24) but use different operational protocols (e.g., the link from node A to node B is an OSPF link and the link from node B to node A is an IS-IS link), then the two links 114, despite belonging to the same subnet, may not be considered a link pair. In other words, the determination as to whether two links 114 are a link pair may be based on link termination and direction information and, optionally, one or more of subnetwork address information, protocol type information, or the like, as well as various combinations thereof. It is noted that, in at least some embodiments, links 114 between a common pair of nodes 112 may be considered to be common link resources as long as the links 114 are deemed to be a link pair.

The communication network 110 may include all or part of the end-to-end communication path. The communication network 110 may be used for various purposes or within various contexts. For example, communication network 110 may be a core IP/MPLS network supporting communication paths between ingress points and egress points of the core IP/MPLS network (e.g., the path via the communication network represents only a portion of the end-to-end path), an edge IP/MPLS network supporting communication between customer networks and a core IP network, a combination of edge and core IP/MPLS networks supporting communication between customer locations, an optical transport network supporting communication between customer networks, or the like, as well as various combinations thereof.

The path determination element 120 may be configured to determine (or compute) communication paths for communication network 110. The path determination element 120, for a pair of nodes 112 (including a first node 112 and a second node 112), may be configured to determine both a forward communication path between the pair of nodes 112 (from the first node 112 to the second node 112) and a reverse communication path between the pair of nodes 112 (from the second node 112 to the first node 112). In general, a path between a pair of nodes 112 may be specified as a sequence of nodes 112 and associated connecting links 114 which may be traversed to travel, end-to-end, between the pair of nodes 112. The path determination element 120 may be configured to determine the forward and reverse communication paths such that determination of the reverse communication path for the pair of nodes 112 is performed in conjunction with determination of the forward communication path for the pair of nodes 112. The determination of the forward communication path and reverse communication path in this manner ensures that determination of the forward communication path also provides determination of the corresponding reverse communication path. The determination of the forward communication path and reverse communication path in this manner also ensures that the forward and reverse communication paths follow the same path (although in different directions) through the communication network 110 and, thus, share resources of the communication network 110 (e.g., traverse the same set of nodes using common link resources). The path determination element 120 may be configured to determine communication paths for the communication network 110 based on communication network information and path constraint information.

The communication network information may include various types of information describing communication network 110. The communication network information may include topology information including identification of the nodes 112 and the links 114 of the communication network 110, the manner in which the nodes 112 and the links 114 of the communication network 110 are connected, and the like. The communication network information may include node information associated with nodes 112, such as one or more of node weight information indicative of node weights of the nodes 112, node capability information indicative of the capabilities of the nodes 112 (e.g., port speeds, processing capabilities, protocols supported, or the like), configuration information indicative as to the manner in which the nodes 112 are configured, operational status information of the nodes 112, or the like, as well as various combinations thereof. The communication network information may include link information associated with links 114, such as link weight information indicative of link weights of the links 114, link capability information indicative of the capabilities of the links 114 (e.g., total bandwidth which could be supported, available bandwidth that is current available, or the like), link pairing information which may be used to determine link pairings of links 114 between common node pairs 112 (e.g., link termination point information indicating whether links 114 terminate on the same nodes, link direction information indicating the directions of links 114, IP addressing indicating whether links 114 belong to the same IP subnetwork, protocol type information indicating the protocols used by links 114, or the like), or the like, as well as various combinations thereof. The communication network information may include any other information which may be used for determining communication paths within communication network 110. The path determination element 120 may obtain the communication network information in any suitable manner (e.g., based on interaction with the communication network 110 using one or more discovery mechanisms, from a network topology management system, from a database that is maintained by or a least accessible to path determination element 120, or the like, as well as various combinations thereof).

The path constraint information may include information describing path constraints associated with communication paths to be determined in communication network 110. The path constraints for a communication path may include one or more of a set of one or more link-level constraints (which also may be referred to herein as individual constraints) which are to be satisfied for links 114 of the communication path, a set of one or more node-level constraints (which also may be referred to herein as individual constraints) that are to be satisfied for nodes 112 of the communication path, a set of one or more path-level constraints (which also may be referred to herein as cumulative constraints) which are to be satisfied for the overall communication path, or the like, as well as various combinations thereof. For example, link-level constraints for a communication path may include a maximum cost of a link 114 (e.g., any links 114 exceeding this cost cannot be included in the communication path), a minimum amount of bandwidth which must be supported by a link 114 (e.g., any links 114 having less bandwidth cannot be included in the communication path), or the like, as well as various combinations thereof. For example, node-level constraints for a communication path may include a node inclusion list (e.g., listing any nodes 112 required to be included in the communication path), a node exclusion list (e.g., listing any nodes 112 which cannot be included in the communication path), a maximum cost of using a node 112 (e.g., the dollar cost of running resources over a node 112 is X and, thus, ensure that X is less than a threshold), a maximum power consumption of a node 112, or the like, as well as various combinations thereof. For example, path-level constraints may include a maximum number of hops of the communication path, a maximum cost of the communication path, or the like, as well as various combinations thereof. For example, where the goal is to determine bidirectional communication paths between end node A and end node B, this may include finding the shortest path from A to B where all links support 1 Mbps of bandwidth and finding the shortest path from B to A where all of the links support 2 Mbps of bandwidth. For example, where the goal is to determine bidirectional communication paths between end node A and end node B, this may include finding the shortest path from A to B where the maximum sum cost is 10 and finding the shortest path from B to A where the maximum sum cost is 8. For example, where the goal is to determine bidirectional communication paths between end node A and end node B, this may include finding the shortest path from A to B where all links support 2 Mbps of bandwidth and the maximum sum cost is 8 and finding the shortest path from B to A where all of the links support 3 Mbps of bandwidth. For example, where the goal is to determine bidirectional communication paths between end node A and end node B, this may include finding the shortest path from A to B where all links support 4 Mbps of bandwidth finding the shortest path from B to A where all of the links support 3 Mbps of bandwidth and the maximum sum cost is 7. It will be appreciated that the foregoing examples are merely a few examples of constraints and the ways in which constraints may be applied in a bidirectional constrained path search. The path determination element 120 may obtain the path constraint information in any suitable manner (e.g., determining path constraints for a communication path from a communication path request that requests determination or establishment of the communication path between the pair of end nodes, from a customer profile associated with a customer for which the communication path between the pair of end nodes is to be determined or established (e.g., from a Service Level Agreement (SLA) or other suitable information), or the like, as well as various combinations thereof).

The path determination element 120 may be configured to determine the forward communication path from the first end node 112 to the second end node 112 and to determine the reverse communication path from the second end node 112 to the first end node 112 by determining a weighted directed graph between the first end node 112 and the second end node 112 and determining the forward and reverse communication paths based on a constraint-based traversal of the weighted directed graph in a forward direction from the first end node 112 toward the second end node 112.

The path determination element 120 may determine the weighted directed graph between the first end node 112 and the second end node 112 based on communication network information associated with the communication network 110. The determination of a weighted directed graph based on communication network information will be understood by one skilled in the art.

The path determination element 120 may determine the forward and reverse communication paths, based on a constraint-based traversal of the weighted directed graph in a forward direction from the first end node 112 toward the second end node 112, using a constraint-based graph traversal processor or algorithm that is configured to perform a combination of evaluating forward links for inclusion in the forward communication path (based on a set of forward path constraints associated with the forward communication path) and evaluating reverse links for inclusion in the reverse communication path (based on a set of reverse path constraints associated with the reverse communication path). The constraint-based traversal of the weighted directed graph may be performed (1) using a modified version of an existing constraint-based graph traversal process, that is configured to traverse a weighted directed graph in the forward direction (e.g., a constrained shortest path first (CSPF) process or other suitable type of constraint-based graph traversal process (e.g., a constraint-based version of OSPF, a constraint-based version of IS-IS, or the like), that is modified to evaluate reverse path constraints for the reverse communication path during traversal of the weighted directed graph in the forward direction for the forward communication path) or (2) using a new constraint-based graph traversal process that is configured to traverse a weighted directed graph in the forward direction while also evaluating reverse path constraints for the reverse communication path during traversal of the weighted directed graph in the forward direction for the forward communication path. The operation of path determination element 120 in determining the forward and reverse communication paths may be further understood by way of reference to the example communication network of FIG. 2 and the example methods of FIG. 3 and FIG. 4.

The path determination element 120 may be configured to determine the forward and reverse communication paths between a pair of end nodes 112 for various purposes (e.g., for purposes of establishing the forward and reverse communication paths in the communication network 110, for purposes of pre-computing backup paths which may be established in the communication network 110 responsive to a failure in the communication network 110, or the like, as well as various combinations thereof). The path determination element 120 may be configured to determine the forward and reverse communication paths between a pair of end nodes 112 in response to various trigger conditions. For example, the path determination element 120 may determine the forward and reverse communication paths between a pair of end nodes 112 responsive to a request from a customer. For example, the path determination element 120 may determine the forward and reverse communication paths between a pair of end nodes 112 at a particular time responsive to a determination that forward and reverse communication paths are to be established at the particular time (e.g., based on a customer profile, path scheduling information, or the like). For example, the path determination element 120 may determine the forward and reverse communication paths between a pair of end nodes 112 responsive to a determination that additional communication resources are needed between the pair of end nodes 112. For example, the path determination element 120 may determine the forward and reverse communication paths between a pair of end nodes 112 responsive to detection of an event(s) in communication network 110 (e.g., based on a determination that a node(s) 112 has been turned-up in the communication network 110, based on a request from a node 112 (e.g., a request for establishment of one or more LSPs), based on a detection of a failure of a node 112 or a link 114, or the like, as well as various combinations thereof). The path determination element 120 may be configured to determine the forward and reverse communication paths between a pair of end nodes 112 for various other purposes or in response to various other types of trigger conditions.

The path determination element 120 may be implemented within, or associated, with the communication network 110 in various ways. In one embodiment, for example, the path determination element 120 may be implemented as a Path Computation Element (PCE) or as a portion of a PCE. In one embodiment, for example, the path determination element 120 may be implemented as a Provisioning System (PS) or as a portion of a PS. In one embodiment, for example, the path determination element 120 may be implemented as an Element Management System (EMS) or as a portion of an EMS. In one embodiment, for example, the path determination element 120 may be implemented as a Network Management System (NMS) or as a portion of an EMS. In one embodiment, for example, the path determination element 120 may be implemented as a Software Defined Controller or as a portion of a Software Defined Controller. The path determination element 120 may be implemented, or associated with the communication network 110, in various other ways.

It will be appreciated that, although primarily presented with respect to a specific arrangement of communication network 110 (illustratively, specific numbers of nodes 112 and links 114 connected in a specific arrangement), the communication network 110 may include fewer or more nodes 112 or links 114 which may be arranged in various other ways.

Figure 2:
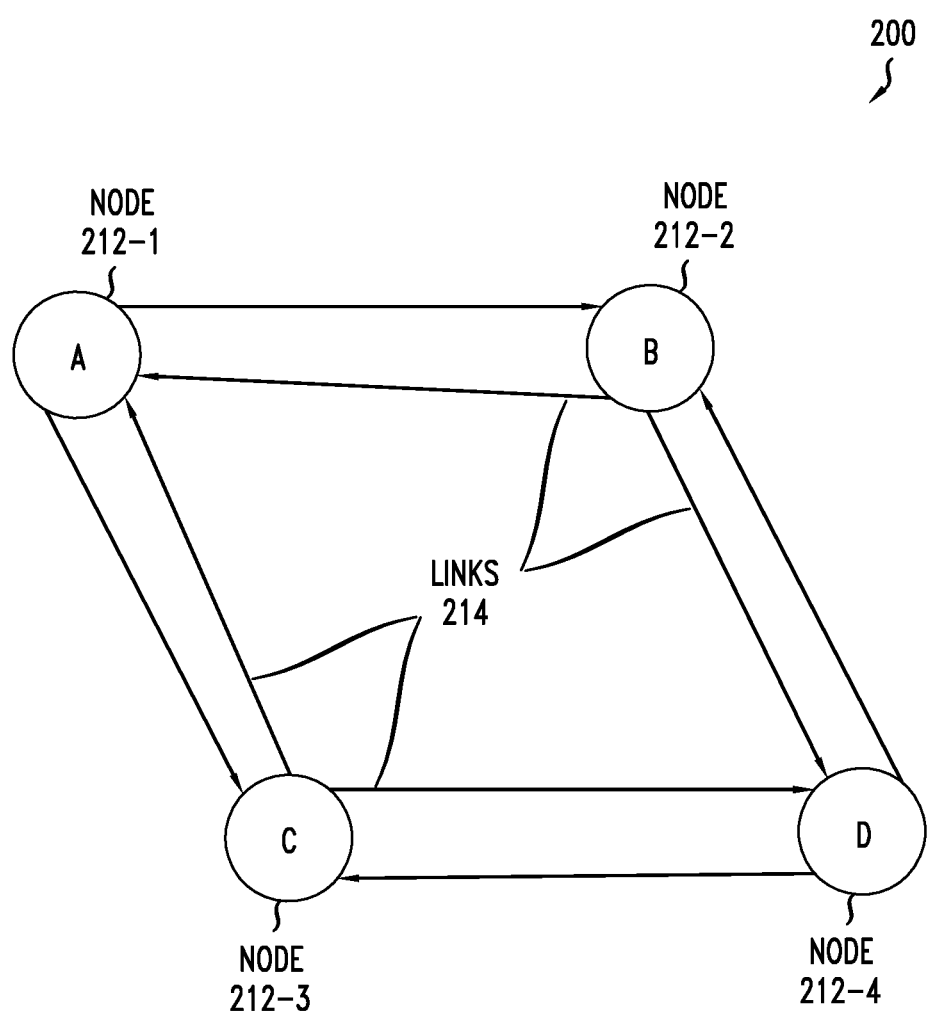
FIG. 2 depicts an exemplary communication network for use in illustrating a bidirectional constrained path search.

FIG. 2 depicts an exemplary communication network for use in illustrating a bidirectional constrained path search.

The communication network 200 includes four nodes 212-1-212-4 (collectively, nodes 210) which also are labeled as nodes A, B, C, and D, respectively. The communication network 200 also includes various links 214 arranged as follows: a link from node A to node B (cost=5), a link from node B to node A (cost=10), a link from node A to node C (cost=3), a link from node C to node A (cost=1), a link from node B to node D (cost=1), a link from node D to node B (cost=2), a link from node C to node D (cost=2), and a link from node D to node C (cost=4).

The bidirectional constrained path search is being performed to determine a pair of communication paths between node A and node D, such that node A and node D will be understood to be the end nodes of the communication path being determined (even though they may not be endpoint terminals or the final destinations of the data to be transported via the communication paths). The bidirectional constrained path search is being performed to determine a pair of communication paths between node A and node D as follows: (1) find a shortest forward communication path from node A to node D that satisfies a path-level cost constraint that the total cost of the forward communication path does not exceed 8 and (2) find a shortest reverse communication path from node D to node A that satisfies a path-level cost constraint that the total cost of the reverse communication path does not exceed 6 where (3) the forward communication path and the reverse communication path utilize a common set of resources of communication network 200 (e.g., traverse the same set of nodes using common link resources).

The bidirectional constrained path search mechanism begins by selecting the link from node A to node B and evaluating this link with respect to the forward path constraint (total cost≤8). Here, the cost of the link from node A to node B is 5 such that the link from node A to node B satisfies the forward path constraint and, thus, could be selected as part of the forward communication path from node A to node D. The bidirectional constrained path search then identifies the link from node B to node A as being paired with the link from node A to node B (since these links are directed in opposite directions between the same pair of nodes and, optionally, may share other network information that causes them to be considered a link pair) and evaluates the link with respect to the reverse path constraint (total cost≤6). Here, the cost of the link from node B to node A is 10 such that the link from node B to node A does not satisfy the reverse path constraint and, thus, cannot be selected as part of the reverse communication path from node D to node A. As a result, even though the link from node A to node B satisfied the forward path constraint and, thus, could be selected as part of the forward communication path from node A to node D, the link from node A to node B is rejected from being included in the forward communication path due to the determination that the link from node B to node A does not satisfy the reverse path constraint and, thus, cannot be selected as part of the reverse communication path from node D to node A. In other words, for the forward link from node A to node B and the reverse link from node B to node A, the forward link from node A to node B is not selected for use in the forward communication path and the reverse link from node B to node A is not selected for use in the reverse communication path based on a determination that at least one of the paired links does not satisfy its associated constraints (in this case, the reverse link from node B to node A failed to satisfy the reverse path constraint). The bidirectional constrained path search then continues to try to determine the forward and reverse communication paths by remaining at the current node (node A) and selecting a next available forward link for evaluation.

The bidirectional constrained path search mechanism next selects the link from node A to node C and evaluates this link with respect to the forward path constraint (total cost≤8). Here, the cost of the link from node A to node C is 3 such that the link from node A to node C satisfies the forward path constraint and, thus, could be selected as part of the forward communication path from node A to node D. The bidirectional constrained path search then identifies the link from node C to node A as being paired with the link from node A to node C (since these links are directed in opposite directions between the same pair of nodes and, optionally, may share other network information that causes them to be considered a link pair) and evaluates the link with respect to the reverse path constraint (total cost≤6). Here, the cost of the link from node C to node A is 1 such that the link from node C to node A satisfies the reverse path constraint and, thus, can be selected as part of the reverse communication path from node D to node A. In other words, for the forward link from node A to node C and the reverse link from node C to node A, the forward link from node A to node C is selected for use in the forward communication path and the reverse link from node C to node A is selected for use in the reverse communication path based on a determination that both the forward link satisfies the forward path constraint and the reverse link satisfies the reverse path constraint. The bidirectional constrained path search then continues to try to determine the forward and reverse communication paths by traversing the graph to the next node (node C, since the links between A and C have been selected for inclusion in the communication paths) and selecting an available forward link for evaluation.

The bidirectional constrained path search mechanism next selects the link from node C to node D and evaluates this link with respect to the forward path constraint (total cost≤8). Here, the cost of the link from node C to node D is 2, resulting in a summation cost on the current path of 5, such that the link from node C to node D satisfies the forward path constraint and, thus, could be selected as part of the forward communication path from node A to node D. The bidirectional constrained path search then identifies the link from node D to node C as being paired with the link from node C to node D (since these links are directed in opposite directions between the same pair of nodes and, optionally, may share other network information that causes them to be considered a link pair) and evaluates the link with respect to the reverse path constraint (total cost≤6). Here, the cost of the link from node D to node C is 4, resulting in a summation cost for the reverse communication path of 5, such that the link from node D to node C satisfies the reverse path constraint and, thus, can be selected as part of the reverse communication path from node D to node A. In other words, for the forward link from node C to node D and the reverse link from node D to node C, the forward link from node C to node D is selected for use in the forward communication path and the reverse link from node D to node C is selected for use in the reverse communication path based on a determination that both the forward link satisfies the forward path constraint and the reverse link satisfies the reverse path constraint. The bidirectional constrained path search then continues to try to determine the forward and reverse communication paths by traversing the weighted directed graph to the next node (node D, since the links between C and D have been selected for inclusion in the communication paths).

The bidirectional constrained path search mechanism arrives at node D and identifies node D as being the endpoint of the forward communication path. Accordingly, the bidirectional constrained path search ends, as the bidirectional constrained path search has determined the forward and reverse communication paths between nodes A and D that satisfy the forward and reverse path constraints, respectively. Namely, the bidirectional constrained path search has determined the forward communication path from node A to node D that satisfies the forward path constraint (namely, the path A-C-D has a total cost of 5, which is less than the forward path constraint that the total cost be less than 8) and also has determined the reverse communication path from node D to node A that satisfies the reverse path constraint (namely, the path D-C-A has a total cost of 5, which is less than the reverse path constraint that the total cost be less than 6).

It will be appreciated that, in the absence of the bidirectional constrained path search mechanism, the forward communication path and reverse communication path would have been determined independently, which would have resulted in determination of a forward communication path of A-B-D (cost=6) and a reverse communication path of D-C-A (cost=5), such that the resulting forward and reverse communication paths would take different paths (traversing different sets of nodes and links) via the communication network 200. In other words, even though the determined forward and reverse communication paths satisfy the forward path constraints and the reverse path constraints, respectively, the resulting forward and reverse communication paths would be considered a bad result set since the forward and reverse communication paths do not share a common set of resources of communication network 200.

Figure 3:
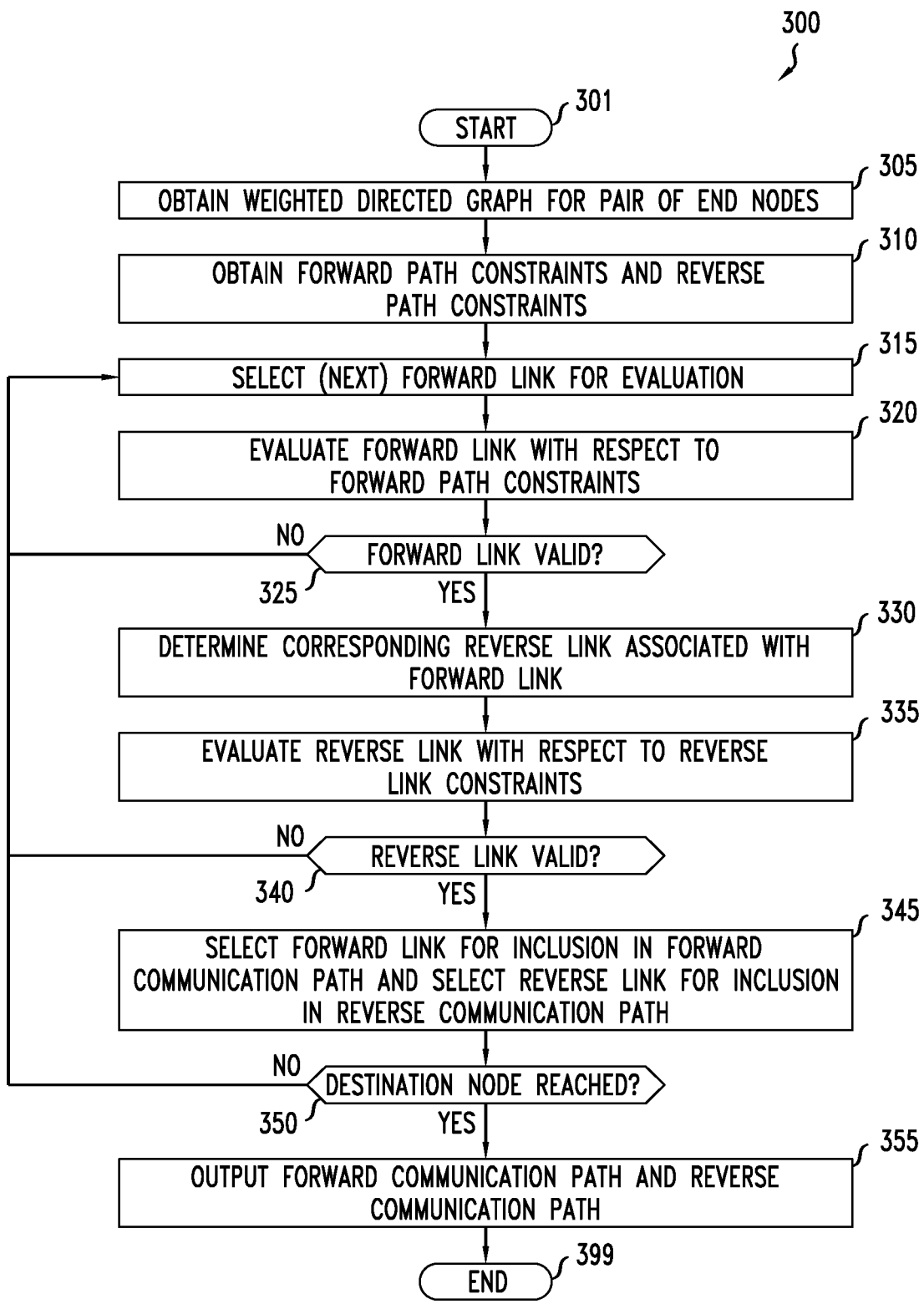
FIG. 3 depicts a flow diagram of a method for performing a bidirectional constrained path search for determining a pair of bidirectional communication paths between a pair of nodes of a network.

FIG. 3 depicts a flow diagram of a method for performing a bidirectional constrained path search for determining a pair of bidirectional communication paths between a pair of nodes of a network. The pair of nodes includes a first end node and a second end node (referred to as source and destination nodes for purposes of indicating direction), where the direction from the first end node/source node to the second end node/destination node is the forward direction and the direction from the second end node/destination node to the first end node/source node is the reverse direction It will be appreciated that, although primarily presented herein as being performed serially, a portion of the functions of method 300 may be performed contemporaneously or may be performed in a different order than as presented in FIG. 3.

At block 301, method 300 begins.

At block 305, a weighted directed graph for the pair of end nodes is obtained. The weighted directed graph is defined based on the pair of end nodes, including nodes and links of the network which are available to be selected for inclusion within the bidirectional communication paths for the pair of end nodes. The weighted directed graph may include information which may be used to evaluate constraints during traversal of the weighted directed graph (e.g., per-link cost information, per-link bandwidth information, or the like, as well as various combinations thereof). The weighted directed graph may be obtained by retrieving the weighted directed graph from memory (e.g., where the weighted directed graph was previously computed), by computing the weighted directed graph, or the like, as well as various combinations thereof.

At block 310, a set of forward path constraints and a set of reverse path constraints are obtained for the pair of end nodes. The set of forward path constraints may include one or more forward path constraints to be satisfied for the forward communication path (e.g., one or more of one or more link-level constraints, one or more node-level constraints, one or more path-level constraints, or the like, as well as various combinations thereof). The set of reverse path constraints may include one or more reverse path constraints to be satisfied for the reverse communication path (e.g., one or more of one or more link-level constraints, one or more node-level constraints, one or more path-level constraints, or the like, as well as various combinations thereof). The forward path constraints and the reverse path constraints may be obtained based on a path determination or establishment request (e.g., where constraints specified for the communication path are included within and retrieved from the path determination or establishment request, where the constraints are retrieved from a profile based on information included within the path determination or establishment request, or the like), based on a profile where the bidirectional path determination is performed independent of a path determination or establishment request, or the like.

At block 315, a (next) forward link of the weighted directed graph is selected for evaluation. The selection of the forward link for evaluation is performed based on a traversal of the weighted directed graph. The traversal of the weighted directed graph is performed in the forward direction (although it will be appreciated that traversal in the forward direction also may include backtracking). In a first pass through block 315, the selection of the forward link for evaluation is performed at the first end node of the pair of end nodes. In each subsequent pass through block 315, the manner in which selection of the forward link for evaluation is performed may depend on the trigger for selection of the forward link for evaluation (i.e., the block of method 300 from which block 315 is reached, as discussed further below). The manner in which a graph traversal process maybe used for traversing a weighted directed graph (which, again, may include backtracking within the weighted directed graph when a "dead end" is reached) will be understood by one skilled in the art. It will be appreciated that, although omitted for purposes of clarity, traversal of the weighted directed graph that includes backtracking along a portion of the bidirectional communication paths may result in discarding of forward link/reverse link pairs that were previously selected for inclusion in the forward and reverse communication paths (as those links may no longer be part of the end-to-end path followed by the forward and reverse communication paths).

At block 320, the forward link of the weighted directed graph is evaluated with respect to, or based on, the forward path constraints. The evaluation of the forward link of the weighted directed graph with respect to the forward path constraints includes a determination as to whether each of the forward path constraints in the set of forward path constraints is satisfied for the forward link (e.g., the link bandwidth of the forward link exceeds the minimum link bandwidth that is to be supported by a link selected for inclusion in the forward communication path, the link cost of the forward link does not exceed a maximum per-link cost for the forward communication path, the total cost of the forward communication path determined up to this point does not exceed the maximum total path cost for the end-to-end path, or the like, as well as various combinations thereof). At block 325, a determination is made as to whether the forward link is valid and, thus, suitable to be selected for inclusion in the forward communication path. The forward link is considered to be valid based on a determination that the forward link satisfies the forward path constraints in the set of forward path constraints for the forward communication path. If a determination is made that the forward link is not valid, method 300 returns to block 315, at which point a next forward link is selected for evaluation. It is noted that this may be a next forward link that is available for evaluation at the current node, traversal to a next branch of the weighted directed graph to identify a next forward link to be evaluated, or the like. If a determination is made that the forward link is valid, method 300 proceeds to block 330.

At block 330, the corresponding reverse link associated with the forward link is determined. The reverse link associated with the forward link may be determined by identifying the forward link and the reverse link as being a link pair (e.g., since the forward and reverse links are running in opposite directions between the same pair of nodes and, optionally, may share other network information that causes them to be considered a link pair). The reverse link associated with the forward link may be determined from the weighted directed graph (e.g., where link pairs are indicated in the weighted directed graph information), based on processing of topology information, or the like, as well as various combinations thereof. At block 335, the reverse link is evaluated with respect to, or based on, the reverse path constraints. The evaluation of the reverse link with respect to the reverse path constraints includes a determination as to whether each of the reverse path constraints in the set of reverse path constraints is satisfied for the reverse link (e.g., the link bandwidth of the reverse link exceeds the minimum link bandwidth that is to be supported by a link selected for inclusion in the reverse communication path, the link cost of the reverse link does not exceed a maximum per-link cost for the reverse communication path, the total cost of the reverse communication path determined up to this point does not exceed the maximum total path cost for the end-to-end path, or the like, as well as various combinations thereof). At block 340, a determination is made as to whether the reverse link is valid and, thus, suitable to be selected for inclusion in the reverse communication path. The reverse link is considered to be valid based on a determination that the reverse link satisfies the reverse path constraints in the set of reverse path constraints for the reverse communication path. If a determination is made that the reverse link is not valid, method 300 returns to block 315, at which point a next forward link is selected for evaluation. Here, even though the forward link was previously determined to be valid for inclusion within the forward communication path, the reverse link is not valid and, thus, the forward link is also rejected (i.e., no longer selected for use in the forward communication path). It is noted that this may be a next forward link that is available for evaluation at the current node, traversal to a next branch of the weighted directed graph to identify a next forward link to be evaluated, or the like. If a determination is made that the reverse link is valid, method 300 proceeds to block 345.

At block 345, the forward link is selected for inclusion in the forward communication path and the reverse link is selected for inclusion in the reverse communication path. Here, the forward and reverse links are selected, because both the forward link is suitable for use in the forward communication path and the reverse link is suitable for use in the reverse communication path. As may be seen from blocks 325 and 340, if either the forward link is determined not to be suitable for inclusion in the forward communication path (e.g., one or more of the forward path constraints is not satisfied for the forward link) or the reverse link is determined not to be suitable for inclusion in the reverse communication path (e.g., one or more of the reverse path constraints is not satisfied for the forward link), neither the forward link nor the reverse link is selected for use in the bidirectional communication paths for the pair of nodes.

At block 350, a determination is made as to whether the destination node has been reached. The determination as to whether the destination node has been reached may be based on a determination of the node at the end of the forward and reverse links most recently selected for inclusion in the respective forward and reverse communication paths (e.g., based on network topology information, based on a traversal or a simulated traversal of the weighted directed graph, or the like). If the destination node has not been reached, method 300 returns to block 315, at which point a next forward link is selected for evaluation. It is noted that, here, since the forward link has been selected for inclusion in the forward communication path, the weighted directed graph is traversed in the forward direction, to the node at the end of the forward link selected for inclusion in the forward communication path, to identify a next forward link to be evaluated. If the destination node has been reached, method 300 proceeds to block 355.

At block 355, the determined forward communication path and reverse communication path are output. The forward communication path is a communication path from the source node to the destination node that satisfies the forward path constraints. The reverse communication path is a path from the destination node to the source node that satisfies the reverse path constraints. The forward and reverse communication paths follow the same end-to-end path between the nodes in the pair of nodes (e.g., in terms of nodes traversed and common link resources traversed). The outputting of the forward communication path and the reverse communication path may include one of more of storage of the forward communication path and the reverse communication path (e.g., information describing the communication paths, such as in terms of nodes and links traversed for the respective communication paths), display of the forward communication path and the reverse communication path on a display, initiation of establishment of the forward communication path and the reverse communication path, or the like, as well as various combinations thereof.

At block 399, method 300 ends.

It will be appreciated that, for purposes of clarity, method 300 of FIG. 3 is arranged such that it is assumed that a pair of bidirectional communication paths is determined for the pair of nodes. However, it will be appreciated that a traversal of the weighted directed graph may not result in identification of a valid pair of bidirectional communication paths for the pair of nodes. It will be appreciated that method 300 of FIG. 3 may be adapted, in various ways, to account for this possibility. For example, the NO branches output from blocks 325 and 340 may enter a block (again, omitted from FIG. 3 for purposes of clarity) in which a determination is made as to whether the traversal of the weighted directed graph is complete (e.g., there are no more branches left to traverse or there are no more available branches that could potentially be traversed to reach the destination node) and (a) if the traversal of the weighted directed graph is not complete then traversal of the weighted directed graph continues or (b) if traversal of the weighted directed graph is complete then method 300 ends.

It will be appreciated that, for purposes of clarity, method 300 of FIG. 3 is arranged such that the forward link is evaluated prior to the reverse link. However, it will be appreciated that, in at least some embodiments, the reverse link may be evaluated before the forward link (e.g., evaluation of the forward link is dependent on the validity of the reverse link), the forward link and the reverse link may be evaluated contemporaneously, or the like. It will be appreciated that combinations of such techniques may be used. It will be appreciated that portions of method 300 may adapted depending on which of these techniques is used; accordingly, a more general representation of the blocks 315, 320, 325, 330, 335, 340, and 345 of method 300 of FIG. 3 is depicted and described with respect to FIG. 4.

Figure 4:
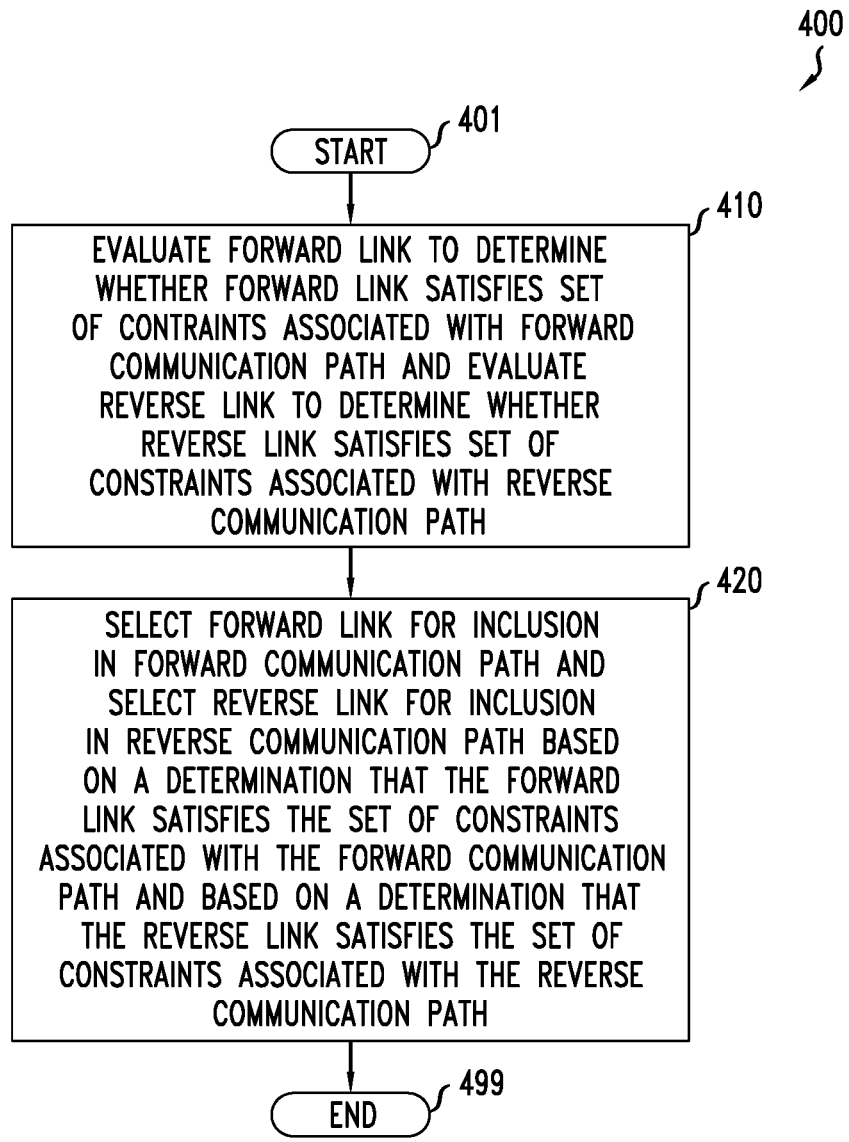
FIG. 4 depicts a flow diagram of a method for use in performing a bidirectional constrained path search for determining a pair of bidirectional communication paths between a pair of nodes of a network.

FIG. 4 depicts a flow diagram of a method for use in performing a bidirectional constrained path search for determining a pair of bidirectional communication paths between a pair of nodes of a network. The pair of nodes includes a first node and a second node (referred to as source and destination nodes for purposes of establishing direction), where the direction from the first/source node to the second/destination node is the forward direction and the direction from the second/destination node to the first/source node is the reverse direction It will be appreciated that method 400 of FIG. 4 may be used to provide blocks 315, 320, 325, 330, 335, 340, and 345 of method 300 of FIG. 3. It will be appreciated that, although primarily presented herein as being performed serially, a portion of the functions of method 400 may be performed contemporaneously or may be performed in a different order than as presented in FIG. 4.

At block 401, method 400 begins.

At block 410, a forward link is evaluated to determine whether the forward link satisfies a set of constraints associated with the forward communication path and a reverse link is evaluated to determine whether the reverse link satisfies a set of constraints associated with the reverse communication path. The forward and reverse links may be evaluated contemporaneously, the reverse link may be evaluated based on a determination that the forward link is valid, or the forward link may be evaluated based on a determination that the reverse link is valid. The forward and reverse links may be evaluated within the context of a forward traversal of a weighted directed graph (e.g., within the context of a path branch traversal during a forward traversal of a weighted directed graph).

At block 420, the forward link is selected for inclusion in the forward communication path and the reverse link is selected for inclusion in the reverse communication path based on a determination that the forward link satisfies the set of constraints associated with the forward communication path and a determination that the reverse link satisfies the set of constraints associated with the reverse communication path.

At block 499, method 400 ends.

It will be appreciated that, although primarily presented herein with respect to embodiments in which, for any pair of nodes in the weighted directed graph, there is only a single forward link and a single reverse link, it is possible that there are multiple forward links and/or multiple reverse links between a pair of nodes in the weighted directed graph. In at least some such embodiments, the multiple links in a given direction may be evaluated with respect to the associated constraints serially, in parallel, or the like (e.g., until finding a first link satisfying the associated constraints, for identifying each link that satisfies the associated constraints and selecting one of the links that satisfies the associated constraints (e.g., a lowest cost link of the links satisfying the associated constraints), or the like).

It will be appreciated that, although primarily presented herein with respect to embodiments in which the set of forward path constraints includes at least one forward path constraint and the set of reverse path constraints includes at least one reverse path constraint, in at least some embodiments the set of forward path constraints may be empty or the set of reverse path constraints may be empty (although it is noted that there will be at least one constraint to be satisfied). This may be referred to herein as an embodiment of determining bidirectional communication paths satisfying a set of unidirectional constraints. For example, where the goal is to determine bidirectional communication paths between A and B, this may include finding the shortest path from A to B where all links support 1 Mbps of bandwidth (the set of constraints in this direction includes a single link-level constraint) and finding the shortest path from B to A (the set of constraints in this direction is empty). For example, where the goal is to determine bidirectional communication paths between A and B, this may include finding the shortest path from A to B (the set of constraints in this direction is empty) and finding the shortest path from B to A where all links support 5 Mbps of bandwidth (the set of constraints in this direction includes a single link-level constraint). For example, where the goal is to determine bidirectional communication paths between A and B, this may include finding the shortest path from A to B where the maximum sum cost is 10 (the set of constraints in this direction includes a single path-level constraint) and finding the shortest path from B to A (the set of constraints in this direction is empty). For example, where the goal is to determine bidirectional communication paths between A and B, this may include finding the shortest path from A to B (the set of constraints in this direction is empty) and finding the shortest path from B to A where the maximum sum cost is 7 (the set of constraints in this direction includes a single path-level constraint). For example, where the goal is to determine bidirectional communication paths between A and B, this may include finding the shortest path from A to B where all links support 2 Mbps of bandwidth and the maximum sum cost is 8 (the set of constraints in this direction includes multiple constraints) and finding the shortest path from B to A (the set of constraints in this direction is empty). For example, where the goal is to determine bidirectional communication paths between A and B, this may include finding the shortest path from A to B (the set of constraints in this direction is empty) and finding the shortest path from B to A where all links support 3 Mbps of bandwidth and the maximum sum cost is 12 (the set of constraints in this direction includes multiple constraints). It will be appreciated that the foregoing examples are merely a few examples of unidirectional constraints and the ways in which unidirectional constraints may be applied in a bidirectional constrained path search. In at least some embodiments, the evaluation of the forward link and the evaluation of the reverse link may include evaluating the forward link to determine whether the forward link is suitable for inclusion within the forward communication path and evaluating the reverse link to determine whether the reverse link is suitable for inclusion within the reverse communication path where at least one of the evaluation of the forward link is based on a set of constraints associated with the forward communication path (or no evaluation is performed, in the absence of constraints, since there is no constraint to be satisfied) or evaluation of the reverse link is based on a set of constraints associated with the reverse communication path (or no evaluation is performed, in the absence of constraints, since there is no constraint to be satisfied).

It will be appreciated that, although primarily presented herein within respect to embodiments in which the forward communication path and the reverse communication path are determined, or captured, during the traversal of the weighted directed graph, in at least some embodiments only the forward communication path is determined, or captured, during the traversal of the weighted directed graph (although it is noted that the reverse communication is still evaluated and validated during the traversal of the weighted directed graph) and the reverse communication path may then be determined, or captured, after traversal of the weighted directed graph is complete. For example, after the forward communication path is determined, the forward communication path may be used to determine (or deduce) the corresponding reverse communication path. For example, the reverse communication path may be determined by traversing the weighted directed graph in the reverse direction along the path of the forward communication path (rather than performing a full traversal of the weighted directed graph in the reverse direction). It will be appreciated that, in at least some such embodiments, for a given pair of nodes within the traversal of the weighted directed graph, only the forward link is selected for inclusion in the forward communication path based on a determination that the forward link satisfies the set of forward path constraints for the forward communication path and based on a determination that the reverse link satisfies the set of reverse path constraints for the reverse communication path (again, the reverse link is evaluated, but not selected, at this time).

It will be appreciated that, although primarily presented herein within respect to use of the bidirectional constrained path search mechanism within the context of communication networks for determining bidirectional communications paths, the bidirectional constrained path search mechanism also may be used within various other contexts for determining bidirectional paths. For example, the bidirectional constrained path search mechanism also may be used for determining bidirectional driving paths within a road network, for determining bidirectional relationships or connections between individuals in a social network, or the like. Accordingly, various terms used herein that are specific to communication networks may be read more generally so as to cover other contexts within which the bidirectional constrained path search mechanism may be applied (e.g., using "forward path" in place of "forward communication path", using "reverse path" in place of "reverse communication path", using "edges" in place of "links", or the like, as well as various combinations thereof.

As discussed hereinabove, the bidirectional constrained path search mechanism is configured to determine bidirectional paths between a pair of nodes in a single path search iteration. In other words, a single shortest path process is executed, using a single graph traversal, in order to determine bidirectional paths between a pair of nodes. This may be compared with the performance that is achieved using existing approaches, in which the forward path and the reverse path are determined independently using one or more path search iterations to determine the forward path and using one or more path search iterations to determine the reverse path. Using such existing approaches, in order to determine bidirectional paths between a pair of nodes, subject to constraints, in a manner for ensuring that the bidirectional paths utilize a common set of resources (e.g., traverse the same set of nodes using common link resources), a minimum of two path search iterations is required (assuming that independent execution of the forward path search iteration and the reverse path search iteration result in selection of the same end-to-end path in terms of nodes traversed) and a worst case of $(k-2)+(m-2)$ path search iterations may need to be performed (where k represents the number of paths from the first node of the node pair to the second node of the node pair and m represents the number of paths from the second node of the node pair to the first node of the node pair) to determine bidirectional paths between the pair of nodes that utilize a common set of resources or to determine that there is no pair of bidirectional paths between the pair of nodes that utilize a common set of resources. Various other advantages or potential advantages of bidirectional constrained path search mechanism are contemplated.

Figure 5:
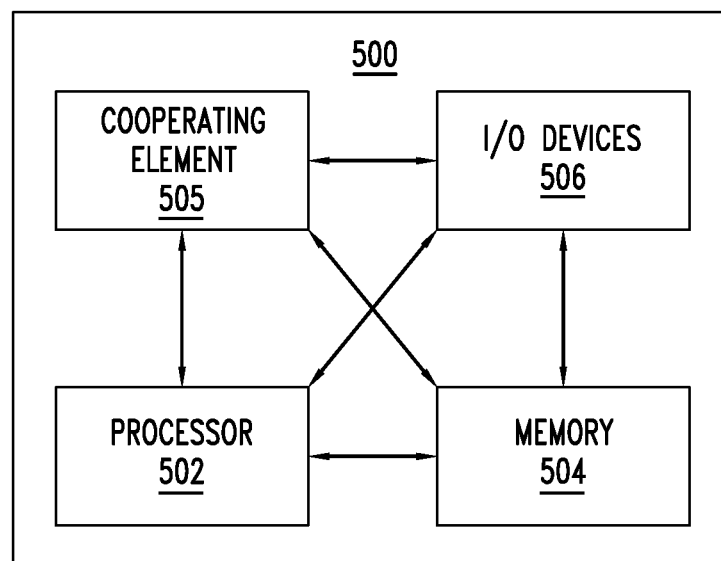
FIG. 5 depicts a high-level block diagram of a computer suitable for use in performing various functions described herein.

FIG. 5 depicts a high-level block diagram of a computer suitable for use in performing various functions described herein.

The computer 500 includes a processor 502 (e.g., a central processing unit (CPU), a processor having a set of processor cores, a processor core of a processor, or the like) and a memory 504 (e.g., a random access memory (RAM), a read only memory (ROM), or the like). The processor 502 and the memory 504 are communicatively connected.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing a node 112, the path determination element 120, a node 212, or any other device or element depicted herein.

It will be appreciated that the functions presented herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that performs various method steps, as circuitry that cooperates with the processor to perform various method steps, or the like, as well as various combinations thereof. Portions of the functions/elements described herein may be implemented as a computer program product storing computer instructions which, when processed by a computer, adapt the operation of the computer such that methods steps and/or techniques described herein are invoked or otherwise provided. Instructions for invoking various methods may be stored in fixed or removable media (e.g., non-transitory computer-readable media), transmitted via a data stream in a broadcast or other signal bearing medium, stored within a memory of a computing device operating according to the instructions, or the like, as well as various combinations thereof.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
evaluate a forward link from a first node to a second node to determine whether the forward link satisfies a set of constraints associated with a forward path to be determined from a first end node to a second end node;
evaluate a reverse link from the second node to the first node to determine whether the reverse link satisfies a set of constraints associated with a reverse path to be determined from the second end node to the first end node; and select the forward link for inclusion in the forward path based on a determination that the forward link satisfies the set of constraints associated with the forward path and a determination that the reverse link satisfies the set of constraints associated with the reverse path.

2. The apparatus of claim 1, wherein the set of constraints associated with the forward path comprises at least one of a link-level constraint, a node-level constraint, or a path-level constraint.

3. The apparatus of claim 1, wherein the set of constraints associated with the reverse path comprises at least one of a link-level constraint, a node-level constraint, or a path-level constraint.

4. The apparatus of claim 1, wherein the processor is configured to evaluate the reverse link based on a determination that the forward link satisfies the set of constraints associated with the forward path.

5. The apparatus of claim 1, wherein the processor is configured to evaluate the forward link and evaluate the reverse link during a forward traversal of a weighted directed graph including the first end node and the second end node.

6. The apparatus of claim 1, wherein the processor is configured to identify the forward link based on a traversal of a weighted directed graph including the forward link and the reverse link.

7. The apparatus of claim 1, wherein the processor is configured to identify the reverse link based on a determined pairing of the forward link and the reverse link.

8. The apparatus of claim 7, wherein the determined pairing of the forward link and the reverse link is based on link termination and direction information and at least one of subnetwork address information or protocol type information.

9. The apparatus of claim 1, wherein the processor is configured to:
select the reverse link for inclusion in the reverse path based on the determination that the forward link satisfies the set of constraints associated with the forward path and the determination that the reverse link satisfies the set of constraints associated with the reverse path.

10. The apparatus of claim 1, wherein the processor is configured to:
determine the forward path from the first end node to the second end node based on a traversal of a weighted directed graph in a forward direction from the first end node toward the second end node; and
determine the reverse path from the second end node to the first end node based on a traversal of the weighted directed graph, along the forward path, in a reverse direction from the second end node toward the first end node.

11. A method, comprising:
evaluating, by a processor, a forward link from a first node to a second node to determine whether the forward link satisfies a set of constraints associated with a forward path to be determined from a first end node to a second end node;
evaluating, by the processor, a reverse link from the second node to the first node to determine whether the reverse link satisfies a set of constraints associated with a reverse path to be determined from the second end node to the first end node; and
selecting, by the processor, the forward link for inclusion in the forward path based on a determination that the forward link satisfies the set of constraints associated with the forward path and a determination that the reverse link satisfies the set of constraints associated with the reverse path.

12. The method of claim 11, wherein the set of constraints associated with the forward path comprises at least one of a link-level constraint, a node-level constraint, or a path-level constraint.

13. The method of claim 11, wherein the set of constraints associated with the reverse path comprises at least one of a link-level constraint, a node-level constraint, or a path-level constraint.

14. The method of claim 11, wherein evaluation of the reverse link is based on a determination that the forward link satisfies the set of constraints associated with the forward path.

15. The method of claim 11, wherein evaluation of the forward link and evaluation of the reverse link is performed during a forward traversal of a weighted directed graph including the first end node and the second end node.

16. The method of claim 11, wherein the forward link is identified based on a traversal of a weighted directed graph including the forward link and the reverse link.

17. The method of claim 11, wherein the reverse link is identified based on a determined pairing of the forward link and the reverse link.

18. The method of claim 17, wherein the determined pairing of the forward link and the reverse link is based on link termination and direction information and at least one of subnetwork address information or protocol type information.

19. The method of claim 11, further comprising:
selecting the reverse link for inclusion in the reverse path based on the determination that the forward link satisfies the set of constraints associated with the forward path and the determination that the reverse link satisfies the set of constraints associated with the reverse path.

20. The method of claim 11, further comprising:
determining the forward path from the first end node to the second end node based on a traversal of a weighted directed graph in a forward direction from the first end node toward the second end node; and
determining the reverse path from the second end node to the first end node based on a traversal of the weighted directed graph, along the forward path, in a reverse direction from the second end node toward the first end node.

21. A non-transitory computer-readable storage medium storing instructions which, when executed by a computer, cause the computer to perform a method, the method comprising:
evaluating a forward link from a first node to a second node to determine whether the forward link satisfies a set of constraints associated with a forward path to be determined from a first end node to a second end node;
evaluating a reverse link from the second node to the first node to determine whether the reverse link satisfies a set of constraints associated with a reverse path to be determined from the second end node to the first end node; and
selecting the forward link for inclusion in the forward path based on a determination that the forward link satisfies the set of constraints associated with the forward path and a determination that the reverse link satisfies the set of constraints associated with the reverse path.

* * * * *